Patented Aug. 24, 1937

2,090,901

UNITED STATES PATENT OFFICE 2,090,901

COMPOSITION OF MATTER CONTAINING CHLORINATED CAOUTCHOUC

Leo Rosenthal, Leverkusen-Wiesdorf, and Reinhard Hebermehl, Cologne-Deutz, Germany, assignors to I. G. Farbenindustrie Aktiengesellschaft, Frankfort-on-the-Main, Germany No Drawing. Application April 20, 1934, Serial No. 721,646. In Germany April 28, 1933

6 Claims. (Cl. 134—17)

The present invention relates to new compositions of matter containing chlorinated caoutchouc.

Solutions of chlorinated caoutchouc have hitherto been prepared by employing aromatic hydrocarbons, chlorinated hydrocarbons or esters of organic acids as solvents. Furthermore, aromatic hydrocarbons having admixed thereto small amounts of benzine have been proposed. Chlorinated hydrocarbons as well as aromatic hydrocarbons and the mixtures of the latter with aliphatic or hydroaromatic hydrocarbons show the disadvantage that they are retained in the chlorinated caoutchouc and the masses and films prepared therefrom for a long time, thus retarding the drying up of the films etc. to an unduly extent. Another drawback inherent to the use of the hitherto employed solvents for chlorinated caoutchouc resides in the fact that the undesirable swelling of the bottom layer can hardly be avoided, if solutions of chlorinated caoutchouc are applied onto a lacquer coating, which contains a considerable amount of drying oils. Esters of organic solvents and ketones, such as methyl-ethyl-ketone, which have also been proposed as solvents for chlorinated caoutchouc are too expensive and cannot be employed, consequently, in practical use. Moreover, acetone has only a swelling effect upon chlorinated caoutchouc and low esters of organic acids do not yield perfectly clear solutions.

We have now found that volatile mixtures of aliphatic and hydroaromatic hydrocarbons with esters of organic acids and/or ketones are very suitable solvents for chlorinated caoutchouc and mixtures containing the same. It is, therefore, the object of the present invention to provide new compositions of matter comprising chlorinated caoutchouc being dissolved in a volatile mixture of aliphatic and/or hydroaromatic hydrocarbons with ketones and/or esters of organic acids.

Preferably only such hydrocarbons, esters and ketones are used, which are capable of being completely evaporated at room temperature. As esters which are suitable for the purposes in question there may be mentioned, for instance, methyl acetate, ethyl acetate, propyl acetate, butyl acetate, amyl acetate, ethyl propionate, ethyl formiate, ethyl ester of acetyl-acetic acid and the like. Among the ketones acetone, methylethyl ketone and cyclohexanone have proved to be very suitable. As to the hydrocarbons there can be used aliphatic hydrocarbons, for instance, those of a boiling point up to about 250° C. and hydroaromatic hydrocarbons, for instance, in form of such benzenes as are obtainable from the so-called "Borneo-naphtha", furthermore, hexahydrotoluene and the like. It may be pointed out that ketones and esters of organic acids may be present simultaneously and hydroaromatic hydrocarbons may be used besides aliphatic hydrocarbons in the same mixture of solvents, it being preferable at any rate to employ the hydrocarbon in excess as compared with the esters and/or ketones.

As chlorinated caoutchoucs there can be used, for instance, those of a chlorine content between about 54 and about 68%. It is preferable, however, to employ a chlorinated caoutchouc of a chlorine content of more than 59%, if the same is used in combination with drying oils or standoils prepared therefrom.

Obviously, the chlorinated caoutchoucs can be employed furthermore in combination with such softening agents and resins as are customarily used in lacquers and paintings. Fillers, pigments, and the like may be added to the solution in the same manner as they are usually employed in the preparation of plastic materials, pigmented lacquers or the like.

The new compositions of matter do not possess the disadvantages inherent to the hitherto employed mixtures. Moreover, they represent clear solutions. This is the more surprising as aliphatic or hydroaromatic hydrocarbons, if employed per se do not dissolve chlorinated rubber and acetone is not capable of yielding technically suitable solutions thereof. Moreover, the aliphatic and hydroaromatic hydrocarbons are distinguished by their being far less toxic than the hitherto employed aromatic or chlorinated hydrocarbons.

The following examples illustrate the invention, without, however, restricting it thereto, the parts being by weight:—

Example 1

The composition contains:—
  30 parts of chlorinated caoutchouc of a chlorine content of 63%,
  10 parts of dibutyl phthalate,
  40 parts of a mixture of aliphatic benzines of a boiling point between 120–160° C.,
  10 parts of ethylacetate,
  10 parts of butylacetate, and, if desired,
  20–30 parts of finely granulated pigments can be kneaded therewith.

Upon wholly or partly evaporating the volatile mixture, the above described composition can be worked up to pressed materials, or a further amount of the above described mixture of solvents (containing benzine, ethylacetate and butylacetate) may be added in order to employ the mixture for lacquer purposes.

Example 2

*Protective coating for iron, concrete and wood*

The composition contains:—

21 parts of chlorinated caoutchouc, of a chlorine content of 62%,
7 parts of a softener obtainable in a known manner by reacting with sulfur upon homologues of benzene, such as toluene or xylene in the presence of aluminium chloride (see U. S. Patents 1,426,430 and 1,427,182,
28 parts of aliphatic benzines of a boiling point between 120 and 150° C.,
12 parts of acetone,
20 parts of butyl acetate,
12–15 parts of titanium dioxide.

Example 3

*Ice-flower-lacquer*

The composition contains:—

12.5 parts of chlorinated caoutchouc of a chlorine content of 65%,
50.0 parts of wood oil,
30.0 parts of lacquer benzine consisting of aliphatic hydrocarbons of the boiling point between 150–190° C.,
7.5 parts of methyl-ethyl-ketone,
0.2 parts of cobalt naphthenate.

Example 4

*Painting color*

20 parts of chlorinated caoutchouc, of a chlorine content of 64%,
15 parts of linseed oil varnish,
42 parts of aliphatic benzines of a boiling point between 100 and 190° C.,
16 parts of amyl acetate,
7 parts of acetone, and
25 parts of a titanium dioxide-chromic hydroxide mixture.

Example 5

*Enamel lacquer*

12.5 parts of chlorinated caoutchouc of a chlorine content of 65%,
50.0 parts of linseed oil-standoil,
12.5 parts of hexahydrotoluene,
12.5 parts of lacquer benzine (see Example 3),
12.5 parts of isopropylacetate,
30–40.0 parts of zinc white,
1.0 part of the blue dyestuff described in Schultz-Farbstofftabellen 1931, No. 1236.

Example 6

*Antirust painting*

21.5 parts of chlorinated caoutchouc of a chlorine content of 64%,
21.5 parts of a linseed oil-wood oil-mixture which contains 1% of lead-cobalte naphthenate, the oil mixture being previously heated to 180° C. for six hours,
20.0 parts of lacquer benzine containing aliphatic and hydroaromatic hydrocarbons, for instance, those benzines which are obtainable from so-called "Borneo-naphtha",
20.0 parts of aliphatic benzines of a boiling point between 120 and 150° C.,
5.0 parts of acetone,
12.0 parts of n-butylacetate,
25.0 parts of iron oxide red.

A completely dried up red lead-linseed-oil-varnish-ground-laying upon iron materials can be coated with this antirust painting without involving the danger of swelling of the bottom layer.

Example 7

*Lacquer for spraying purposes*

20.0 parts of a chlorinated caoutchouc, of low viscosity and a chlorine content of 64%,
6–8.0 parts of olive oil,
20.0 parts of ethyl acetate,
15.0 parts of butylacetate,
27.0 parts of aliphatic benzines of a boiling point between 100 and 150° C.,
10.0 parts of lacquer benzine containing aliphatic and hydroaromatic hydrocarbons, for instance, those benzines which are obtainable from the so-called "Borneo-naphtha".

This lacquer is far better capable of being sprayed than lacquers containing aromatic hydrocarbons as solvents.

Example 8

*Lacquer for soft-rubber*

10 parts of chlorinated caoutchouc of a chlorine content of 64%,
40 parts of linseed oil-stand-oil, which contains 1% of cobalt linoleate,
25 parts of methylacetate,
25 parts of aliphatic benzines of a boiling point between 100 and 130° C.

This lacquer if applied for soft rubber by dipping or brushing yields a strongly adherent non-sticky and elastic coating, which upon drying can be coated again once or several times with the same lacquer without involving the danger of swelling the ground-layer.—It may be pointed out that neither methylacetate nor the aliphatic benzine if taken alone is capable of yielding practically suitable solutions of chlorinated caoutchouc, whereas the above mixture yields clear solutions.

Example 9

*Protective coating for walls, concrete and the like*

20 parts of a chlorinated caoutchouc of 64.5% content of chlorine,
10 parts of chlorinated diphenyl of a chlorine content of 57%,
2 parts of chlorinated naphthalene of a chlorine content of 50%,
16 parts of acetone,
24 parts of butylacetate,
28 parts of aliphatic benzines of a boiling point of 130–150° C.

EXAMPLE 10

*Antirust painting*

20 parts of chlorinated rubber,
20 parts of linseed oil varnish,
10 parts of acetone,
8 parts of propionic acid butylester,
8 parts of cyclohexanone,
20 parts of aliphatic benzines of a boiling point between 120 and 150° C.,
14 parts of white spirit of a boiling point between 150 and 190° C.,
32 parts of aluminium bronze.

EXAMPLE 11

*Protective coating for wood*

20 parts of chlorinated rubber,
25 parts of linseed oil varnish,
8 parts of ethylacetate.
8 parts of butylacetate,
10 parts of acetyl-acetic ester,
7 parts of benzines of a boiling point between 100 and 120° C.
14 parts of benzines of a boiling point between 130 and 150° C.
8 parts of benzines of a boiling point between 160 and 190° C.
30 parts of titanium dioxide tinted with soot.

EXAMPLE 12

*Spraying lacquer*

18 parts of chlorinated rubber,
6 parts of soy bean oil,
15 parts of formic acid ethyl ester,
15 parts of butylacetate,
5 parts of glycolic acid butyl ester,
27 parts of benzines of a boiling point of 125 and 155° C.
10 parts of white spirit of a boiling point of 155 and 200° C.
12 parts of iron oxide red.

We claim:—

1. The composition of matter comprising chlorinated caoutchouc, liquid hydrocarbons selected from the group consisting of aliphatic and hydroaromatic hydrocarbons which liquid hydrocarbons per se are non-solvents for the chlorinated caoutchouc, a liquid oxygen containing compound selected from the group consisting of lower esters of organic acids and lower ketones in sufficient quantity to yield a solution of the chlorinated caoutchouc, the hydrocarbons being used in excess as compared with the oxygen containing compounds.

2. The composition of matter according to claim 1, wherein the liquid hydrocarbons have a boiling point up to about 200° C.

3. The composition of matter comprising chlorinated caoutchouc, a softener, a preponderant amount of a mixture of aliphatic benzines of a boiling point up to about 200° C. and a minor amount of an ester of acetic acid in sufficient quantity to yield a solution of the chlorinated caoutchouc.

4. The composition of matter as claimed in claim 1, wherein the liquid oxygen containing compound is ethylacetate.

5. The composition of matter as claimed in claim 1, wherein the liquid oxygen containing compound is butylacetate.

6. The composition of matter comprising chlorinated caoutchouc, a drying oil, a preponderant amount of a mixture of aliphatic benzines of a boiling point up to about 200° C. and a minor amount of acetone in sufficient quantity to yield a solution of the chlorinated caoutchouc.

LEO ROSENTHAL.
REINHARD HEBERMEHL.